LACY & WATKINS.
Plow-Fender.
No. 44,535.
Patented Oct. 4, 1864.
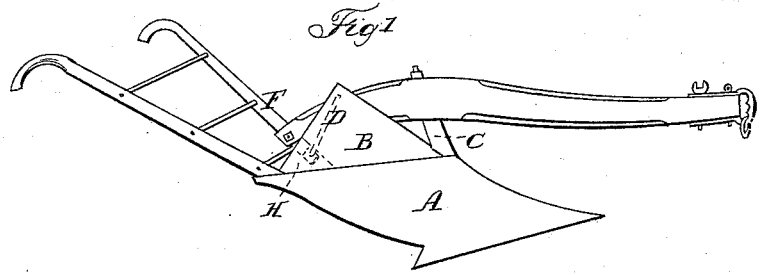
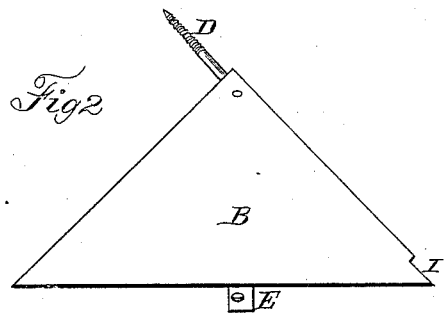
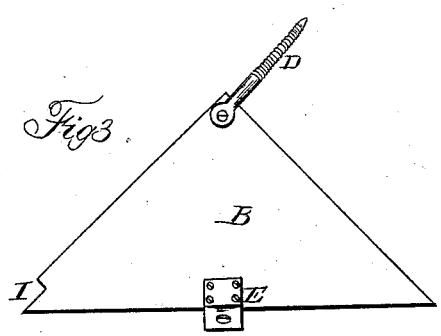
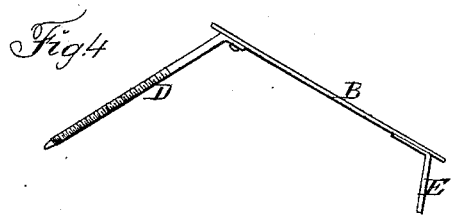
Witnesses
C W Reed
O. Cannon
Inventor.
John Lacy
George Watkins
Coburn & Mann Atty

UNITED STATES PATENT OFFICE.

JOHN LACY AND GEO. WATKINS, OF BRISTOL, WISCONSIN.

STUBBLE-CLEARER FOR PLOWS.

Specification forming part of Letters Patent No. 44,535, dated October 4, 1864.

*To all whom it may concern:*

Be it known that we, JOHN LACY and GEORGE WATKINS, of Bristol, in the county of Kenosha and State of Wisconsin, have invented a new and useful Improved Stubble-Clearer for Plows; and we do hereby declare that the following is a full, clear, and exact description of the same, reference being had to the accompanying drawings and letters of reference marked thereon, which form a part of this specification, and in which—

Figure 1 represents a plow with the stubble-clearer attached; Fig. 2, a front view of the stubble-clearer; Fig. 3, a back view of the same; and Fig. 4, an edge view thereof, showing clearly the shape of the pieces used for attaching it to the plow.

The nature of our invention consists in attaching to the top of the mold-board of a plow a device to keep the stubble and other material from falling over the said mold-board and clogging the plow.

To enable those skilled in the art to manufacture and use our invention, we will proceed to describe the same with particularity.

The same letters of reference represent the corresponding parts in the different figures.

A represents the mold-board of a plow, and B a metallic plate put on at the top of the mold-board and extending up sufficiently high to prevent stubble or other similar material from falling over it and lodging on the inside of the plow, thereby increasing its weight, especially when the soil is moist, and frequently throwing the plow from the ground. The plate B has a notch, I, at one corner, which fits against the standard C and assists in keeping the plate in place and causes it to extend up on the said standard, so that the ends of the stubble, straw, &c., that lodges against the standard C cannot fall over the top of the mold-board A and wind partially around the standard, and thus be firmly held there until the accumulation is so great that the plow becomes unmanageable and is thrown out of the ground; but the ends being kept on the face of the mold-board A or plate B, the action of the furrow as the plow moves along carries the stubble, &c., away, thus preventing the plow from clogging. As the furrow is thrown up against the mold-board A and plate B it of course carries the stubble up with it, and as our invention prevents the stubble from falling over the mold-board or lodging thereon or against the standard C as the furrow rolls down, it must necessarily carry the stubble with it and leave the plow perfectly free and clear.

Every practical farmer knows well that the labor of holding a plow when it is continually clogging up is fully double to what it is when there is nothing of the kind to contend with. Then it is impossible to plow as much ground in a day on account of the time consumed in clearing the plow, and what is done is not done as well, and, besides these things, it occasions great increase of draft to the team hauling the plow. All these inconveniences are overcome by our invention.

We call the plate B a "metallic" plate, because a metallic plate is preferable; but we use a plate of any suitable material. We have used wood and find that answers the purpose very well. We fasten the said plate B in its position by means of the rod D and plate E. The rod D is attached to the upper edge of the plate B and extends down through the plow-handle F, as shown by the dotted lines in Fig. 1, there being a thread cut on that end of it which passes through the handle, and two nuts, H, screwed thereon, one on each side of the plow-handle. The plate E is fastened firmly to the plate B, and also to the top of the mold-board. There is either a joint in the plate E at the angle or it is so fastened to the mold-board as to admit of some play, so that by turning the nuts H on the rod D the plate B can be brought to any desired inclination to the mold-board.

Having thus fully described our improved stubble-clearer for plows, what we claim as our invention, and desire to secure by Letters Patent, is—

Providing a plow with a plate, B, when constructed and arranged substantially as and for the purpose herein set forth and described.

JOHN LACY.
GEORGE WATKINS.

Witnesses:
H. L. EMONS,
F. EMMONS.